Patented May 26, 1953

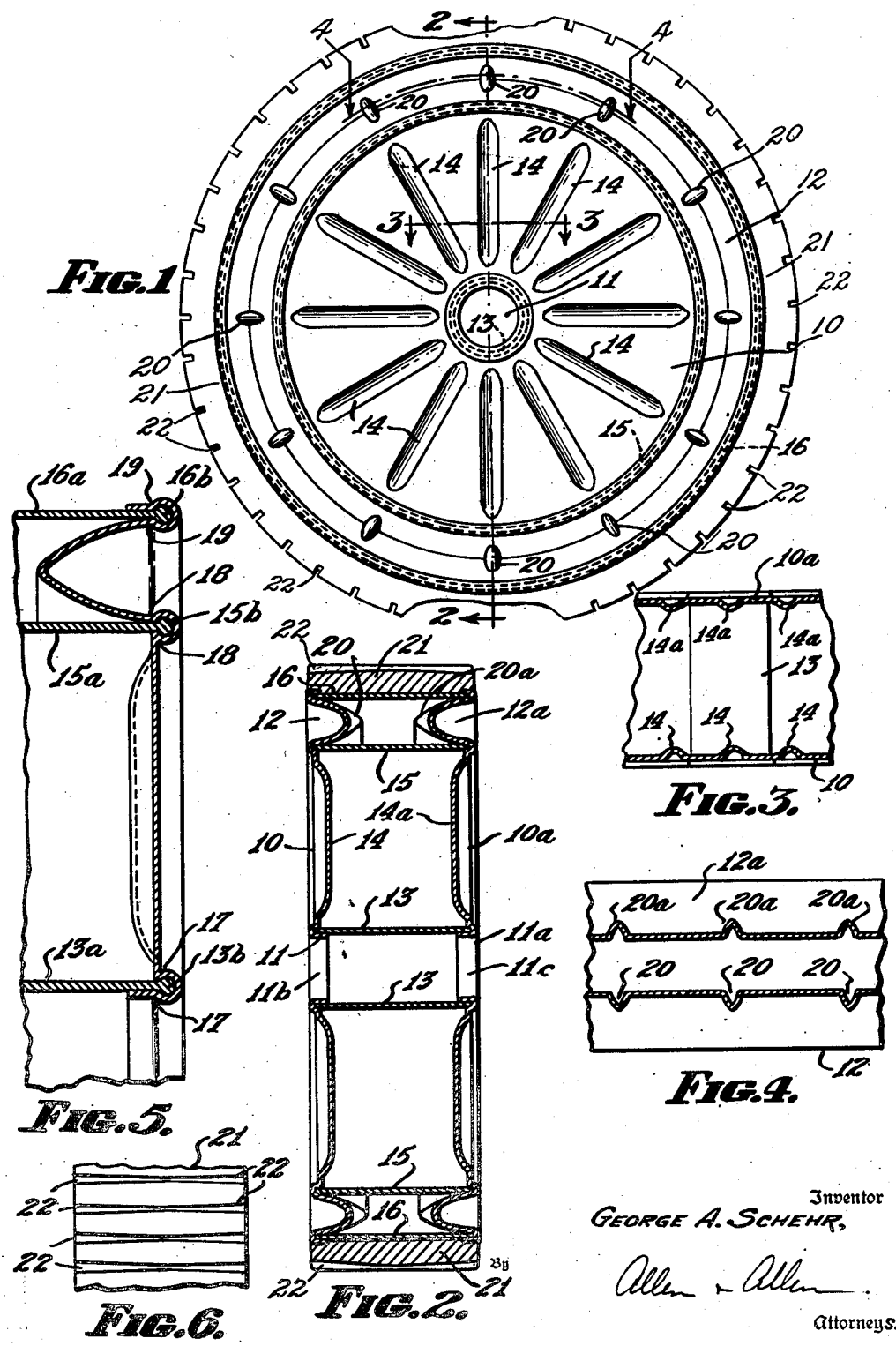
May 26, 1953 — G. A. SCHEHR — 2,639,752
METALLIC RESILIENT WHEEL
Filed Oct. 28, 1950
Inventor
GEORGE A. SCHEHR,
Attorneys.

2,639,752

UNITED STATES PATENT OFFICE 2,639,752

METALLIC RESILIENT WHEEL

George A. Schehr, Cincinnati, Ohio

Application October 28, 1950, Serial No. 192,725

7 Claims. (Cl. 152—74)

This invention relates to a metallic resilient wheel of simple and sturdy construction which wheel, although of general utility, is primarily intended for automobiles.

Generally speaking, a metallic wheel is by its nature non-resilient and if resilience is desired it has generally been necessary to rely upon a pneumatic tire for resiliency. There are of course applications where a rubber tired wheel is undesirable because of cost and maintenance problems and if the wheel is to have a metallic tire, then the wheel is non-resilient, as a result of which it is extremely noisy and rough riding.

It is an object of the present invention to provide a wheel which although of metal and generally of the disc type will have a degree of resilience not heretofore available in metallic wheels. It is another object of the invention to provide a wheel as outlined which will have a major disc portion which will be rigid and an annular portion which will provide for resilience. An ancillary object of the invention is the provision of means for controlling the degree of resilience in the annular portion.

These and other objects of the invention which I shall describe in more detail hereinafter or which will be apparent to one skilled in the art upon reading these specifications, I accomplish by that certain construction and arrangement of parts of which I shall now describe certain exemplary embodiments.

Reference is now made to the drawings forming a part hereof and in which:

Figure 1 is an elevational view of a wheel according to my invention.

Figure 2 is a central cross sectional view of the same taken on the line 2—2 of Figure 1.

Figure 3 is a fragmentary cross sectional view of the same taken on the line 3—3 of Figure 1.

Figure 4 is a fragmentary cross sectional view taken on the line 4—4 of Figure 1.

Figure 5 is a fragmentary view similar to Figure 2 on an enlarged scale showing a slight modification.

Figure 6 is a fragmentary plan view of a portion of a metallic tire which may be used.

Briefly, in the practice of my invention I provide a pair of annular discs having adjacent their outer periphery a relatively deep and narrow annular indentation. The two discs are juxtaposed and are connected by three cylindrical members, one at the center which may serve as a hub for the wheel and the others, one on each side of the relatively deep annular indentations. The indentations are disposed toward each other and a metallic or other suitable tire may be carried by the outer periphery of the wheel beyond the outer cylinder.

Referring now in more detail to the drawings, I have shown in the elevational view of Figure 1 a wheel comprising a disc indicated generally at 10 having a central hole 11 and a relatively deep and narrow annular indentation 12. As seen in Figure 2 there are of course two such discs, the other being indicated at 10a and having the hole 11a and the indentation 12a. The edges of the discs adjacent the hole 11a may be inturned in the form of flanges 11b and 11c upon which may be secured the inner cylindrical member 13. Between the holes 11, 11a and the indentations 12, 12a, the discs 10 and 10a are provided with the radial corrugations 14 and 14a. These radial spoke-like corrugations impart to the central portion of the discs a rigidity necessary to the sustaining of the load.

A second cylinder 15 connects the discs 10 and 10a just to the inside of the indentations 12 and 12a. The outer peripheries of the discs are connected together by the third cylinder 16. It will be clear that because of the indentations 12 and 12a resilience between the cylinders 15 and 16 is provided whereas rigidity is provided between the cylinders 13 and 15.

The cylinders and discs may be secured together in any suitable manner, as by welding or the like. In some instances and for some purposes it may be sufficient to firmly crimp the discs or spin them around beads formed at the edges of the cylinders. Thus in Figure 5 I have shown a modification wherein the cylinders 13a, 15a and 16a are provided with the annular beads 13b, 15b and 16b and wherein the material of the discs is crimped around the beads as indicated at 17, 18 and 19. Of course, with the construction of Figure 5 the joints between the beads and the discs may again be welded or otherwise suitably secured.

In order to control the resiliency of the wheel the annular deep indentations 12 and 12a are provided with evenly spaced gusset-like members which may be constituted of portions reversely struck out from the indentations as indicated at 20 and 20a. It will be clear that the degree of resiliency can be controlled by the depth or extent of the struck-out portions 20. The greater their extent, the less the resiliency of the wheel will be. In their minimum size they of course prevent collapse of the wheel under the loads for which the wheel is designed. Beyond that they can be increased in size and in number to make the wheel less resilient as may be required.

The wheel according to the present invention may be provided with a tire of any desired type. There is shown in broken lines at 21 in Figure 2 a simple metallic tire and in Figure 6 it is shown how the tire may be provided with transverse grooves or the like as at 22 for enhanced traction. The particular tire used and its manner of attachment to the wheel do not constitute a part of the present invention. It will be understood that various modifications may be made which do not depart from the spirit of this invention, and I therefore do not intend to limit myself to details of construction shown herein otherwise than as set forth in the claims which follow.

Having now fully described my invention, what I claim as new and desire to secure by Letters Patent is:

1. A metallic wheel comprising a pair of basically planar annular discs each having a relatively deep and narrow annular indentation adjacent its periphery, a cylinder connecting said discs at their inner peripheries, a second cylinder connecting said discs just inside said indentations, and a third cylinder connecting said discs at their outer peripheries, said annular indentations providing for resiliency between said second and third cylinders.

2. A metallic wheel comprising a pair of basically planar annular discs each having a relatively deep and narrow annular indentation adjacent its periphery, a cylinder connecting said discs at their inner peripheries, a second cylinder connecting said discs just inside said indentations, and a third cylinder connecting said discs at their outer peripheries, and a tire embracing said wheel, said annular indentations providing for resiliency between said second and third cylinders.

3. A metallic wheel comprising a pair of basically planar annular discs each having a relatively deep and narrow annular indentation adjacent its periphery, a cylinder connecting said discs at their inner peripheries, a second cylinder connecting said discs just inside said indentations, and a third cylinder connecting said discs at their outer peripheries, said discs between said first and second mentioned cylinders being provided with radial stiffening means, and said annular indentations providing for resiliency between said second and third cylinders.

4. A wheel according to claim 3, in which said stiffening means comprise radial, spoke-like corrugations extending substantially between said first and second cylinders.

5. A wheel according to claim 1, in which said indentations are provided with elements for controlling the degree of resiliency.

6. A wheel according to claim 1, in which said indentations are provided with spaced gusset-like elements extending at least in part across the respective indentations, to control the degree of resiliency of said wheel.

7. A wheel according to claim 1, in which the bottoms of said indentations are reversely struck up at spaced points to form gusset-like elements extending at least in part across the respective indentations, to control the degree of resiliency of said wheel.

GEORGE A. SCHEHR.

References Cited in the file of this patent

UNITED STATES PATENTS

| Number | Name | Date |
| --- | --- | --- |
| 1,350,370 | Leviston | Aug. 24, 1920 |
| 1,404,411 | Schenck | Jan. 24, 1922 |
| 1,515,144 | Charter | Nov. 11, 1924 |
| 1,789,084 | Schwarz | Jan. 13, 1931 |